(12) United States Patent
Odai et al.

(10) Patent No.: US 6,264,579 B1
(45) Date of Patent: Jul. 24, 2001

(54) TOOTHED BELT WITH POSITIONING-AIDING AND POSITION-IDENTIFYING FUNCTIONS

(75) Inventors: Nobuhiro Odai, Sakado; Tatsuo Arai, Chichibu-chi, both of (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/388,168

(22) Filed: Sep. 1, 1999

(30) Foreign Application Priority Data

Sep. 8, 1998 (JP) .................................................. 10-254404

(51) Int. Cl.[7] ................................. F16H 7/02; F16G 5/20
(52) U.S. Cl. ........................... 474/153; 474/205; 474/207; 474/252
(58) Field of Search ..................................... 474/153, 204, 474/266, 251, 250, 260, 253, 252, 205, 206, 207, 262

(56) References Cited

U.S. PATENT DOCUMENTS

| | | | | |
|---|---|---|---|---|
| 4,938,736 | * | 7/1990 | Miranti, Jr. ........................... | 474/205 |
| 4,998,906 | * | 3/1991 | Moss ................................. | 474/205 X |
| 5,200,767 | * | 4/1993 | Tsukada et al. .................. | 474/153 X |
| 5,704,862 | * | 1/1998 | Janne et al. ...................... | 474/252 X |
| 6,123,473 | * | 9/2000 | Guillen et al. ................... | 474/252 X |

* cited by examiner

*Primary Examiner*—Thomas R. Hannon
*Assistant Examiner*—Marcus Charles
(74) *Attorney, Agent, or Firm*—Dann, Dorfman, Herrell and Skillman; Henry H. Skillman

(57) ABSTRACT

In a toothed belt including at least one positioning-aiding/position-identifying tooth and a large number of driven teeth engageable with a driving toothed pulley, the positioning-aiding/position-identifying tooth is formed in a predetermined positioning area of the toothed belt and has a different shape from that of each of the driven teeth. The total amount of rubber used in the positioning-aiding/position-identifying tooth is set to equal an assumptive total amount of rubber in one or more imaginary driven teeth that could be formed in the predetermined positioning area if the positioning-aiding/position-identifying tooth was not formed in that area, and the amount of backing rubber used in a portion right behind the positioning-aiding/position-identifying tooth is set to be equal to or greater than an assumptive amount of backing in a portion right behind the imaginary driven teeth.

20 Claims, 4 Drawing Sheets

TOOTHED BELT WITH POSITIONING-AIDING AND POSITION-IDENTIFYING FUNCTIONS

BACKGROUND OF THE INVENTION

1. Field of the Invention

The present invention relates generally to a toothed belt having functions of aiding in positioning and mounting a desired attachment or part on a predetermined position thereof and identifying that predetermined position, which will hereinafter also be called a "positioning-aiding and position-identifying toothed belt"). More particularly, the present invention relates to a positioning-aiding and position-identifying toothed belt which can be suitably used as a carriage belt for a printer.

2. Description of the Related Art

Toothed belts generally comprise a laminated structure of a tooth rubber member, a backing rubber member and a core wire or tension member embedded between the tooth rubber member and the backing rubber member. To manufacture such toothed belts, an unvulcanized rubber compound sheet, which will be ultimately formed into the above-mentioned tooth rubber and backing rubber members, is wound around a cylindrical tooth-forming die having a tooth cloth sheet and a tension member previously wrapped therearound, so that the rubber compound sheet is formed into a predetermined shape and vulcanized. The resultant vulcanized rubber compound sheet is then cut into rings of predetermined widths to provide a plurality of endless toothed belts.

In recent years, such a toothed belt has been used popularly as a carriage belt of a printer, as schematically illustrated in FIG. 4. In this illustrated example, the printer carriage belt has a toothed belt portion with a series of driven teeth 10 formed in the inner surface of the belt along part of its length, and a flat belt portion with a non-toothed or flat inner surface. The toothed belt portion with the driven teeth 10 is wound around and engaged with a pulley P1 with driving teeth (hereinafter "driving toothed pulley"), while the flat belt portion is wound around a non-toothed follower pulley P2. Printer carriage C is mounted on a boundary region between the toothed belt portion and the flat belt portion, so that the printer carriage C performs a printing function by being reciprocally moved over a predetermined distance as the toothed carriage belt is driven via the driving toothed pulley P1.

In the past, the printer carriage C was mounted on the toothed carriage belt by mounting pieces, projecting from the body of the carriage C, being pressed against the inner and outer surfaces of the carriage belt to thereby tightly grip the belt across the belt's thickness, using a visual carriage-positioning mark put at a predetermined position on the outer surface of the carriage belt.

Although the toothed carriage belt with the visual carriage positioning mark allowed a human operator to attach the printer carriage C accurately to the predetermined position while being guided by the positioning mark, manufacturing such a toothed carriage belt required an additional step of putting the positioning mark on the belt, which considerably increased the costs of the carriage belt. In addition, the printer carriage was apt to be undesirably displaced in position during the mounting operation, which resulted in poor reliability of the mounting operation.

With a view to providing solutions to the above-discussed problems, an improved toothed belt has been proposed, which, as shown in FIG. 5, includes a positioning-aiding/position-identifying tooth 12 formed integrally on the tooth rubber member and having a length substantially equal to a sum of the lengths of two driven teeth 10 and one groove between the two driven teeth 10. With the proposed toothed belt, the human operator can readily ascertain the carriage-mounting position by both the outer appearance and the actual touch of the positioning-aiding/position-identifying tooth 12 which are different from those of the driven teeth 10, and thereby effectively prevent the positional displacement and deviation of the printer carriage from occurring during the mounting operation.

However, the proposed toothed belt is not satisfactory for the following reasons. Forming the positioning-aiding/position-identifying tooth 12, having the length substantially equal to two driven teeth 10 and one intervening groove as shown in FIG. 5, unavoidably results in a shortage of the tooth rubber material between two driven teeth 10 adjacent to the positioning-aiding/position-identifying tooth 12. This tooth rubber shortage leads to insufficient projection or height of the positioning-aiding/position-identifying tooth 12, which would prevent accurate mounting of the printer carriage C on the predetermined position of the belt. If some attempt is made to form the positioning-aiding/position-identifying tooth 12 into a sufficient height or projection, then there would be caused a shortage of the backing rubber material behind the positioning-aiding/position-identifying tooth 12, which would produce a recess in the outer surface of the tooth belt. In such a case, the tension member 30, which should have been embedded completely between the tooth rubber member and the backing rubber member, tends to be exposed and the rubber is apt to scale off the belt body, which would reduce the durability of the toothed belt. Consequently, there arises the problem that a desired part, such as a printer carriage, can not be properly mounted on a predetermined position of the proposed toothed belt.

As one approach to eliminate the problems encountered by the proposed toothed belt, an attempt has been made to feed a sufficient amount of the rubber material to the portion of the toothed belt where the positioning-aiding/position-identifying tooth 12 is to be formed. However, this approach is also disadvantageous in that there arises a need not only to change a belt-forming die provided with the cylindrical tooth forming die but also to set special conditions for feeding the unvulcanized rubber compound sheet and special conditions for shaping, vulcanizing, etc. of the unvulcanized rubber compound sheet, so that the belt manufacturing process would become very complex and the manufacturing costs of the toothed belt would increase accordingly.

Similar problems would arise even where the tooth belt is used as a belt for taking out information from a predetermined position of the belt; that is, it is not possible to accurately recognize information, indicative of a printing position or the like, that should be transmitted from the predetermined position.

SUMMARY OF THE INVENTION

It is accordingly an object of the present invention to provide a positioning-aiding and position-identifying toothed belt which allows a desired part to be reliably mounted on a predetermined position of the belt and permits accurate recognition of information from that predetermined position, and which also achieves superior durability of its positioning-aiding/position-identifying tooth by just requiring a slight modification of a belt-forming die.

To accomplish the above-mentioned object, the present invention provides a toothed belt including at least one positioning-aiding/position-identifying tooth and a large number of driven teeth engageable with a driving toothed pulley. The positioning-aiding/position-identifying tooth is formed in a predetermined positioning area of the toothed belt and has a different shape from that of each of the driven teeth. The toothed belt of the present invention is characterized primarily in that the total amount of rubber used in the positioning-aiding/position-identifying tooth is set to equal an "assumptive" total amount of rubber in one or more imaginary driven teeth that could be formed in the predetermined positioning area if the positioning-aiding/position-identifying tooth was not formed in that area, and the amount of backing rubber used in a portion right behind the positioning-aiding/position-identifying tooth is set to be equal to or greater than an "assumptive amount" of backing rubber in a portion right behind the imaginary driven teeth.

In the present invention, the length, in the longitudinal direction of the toothed belt, of the positioning-aiding/position-identifying tooth is substantially equal to or greater than a sum of the lengths of two driven teeth and one groove between the two driven teeth. Further, the positioning-aiding/position-identifying tooth is formed in the neighborhood of one end of a toothed belt portion having the large number of driven teeth and extending along part of the length of the toothed belt. These arrangements provide even more effective solutions to the problems presented by the conventionally known toothed belts.

In the present invention, it is essential that the total amount X of rubber used in the positioning-aiding/position-identifying tooth be set to equal an assumptive total amount of rubber Y in one or more imaginary driven teeth that could be formed in the predetermined positioning area in place of the positioning-aiding/position-identifying tooth (i.e., X=Y). If X≠Y, then there would arise a need to set special conditions for feeding a sufficient amount of the rubber material to the predetermined area where the positioning-aiding/position-identifying tooth is to be formed and special conditions for vulcanizing, shaping, etc. of the unvulcanized rubber compound sheet, so that the belt manufacturing process would become complex and the manufacturing costs of the toothed belt would increase accordingly, as noted above in relation to the conventional toothed belts.

Also, in the present invention, it is essential that the amount of backing rubber x used in a portion right behind the positioning-aiding/position-identifying tooth is set to be equal to or greater than an "assumptive" amount of backing rubber y in a portion right behind the imaginary driven teeth that could be formed in the predetermined positioning (i.e., x≧y). If x<y, then the positioning-aiding/position-identifying tooth can not be formed accurately to have a predetermined contour and sufficient projection.

Further, in the context of the present invention, the terms "total amount X of rubber used in the positioning-aiding/position-identifying tooth" mean a sum of the amounts of the tooth rubber and backing rubber required to form the positioning-aiding/position-identifying tooth, while the terms "assumptive total amount of rubber Y in one or more imaginary driven teeth that could be formed in the predetermined positioning area" mean a sum of the amounts of the tooth rubber and backing rubber that would be required for forming the imaginary driven teeth in the predetermined positioning area. Further, the terms "amount of the tooth rubber" mean an amount of rubber present in the positioning-aiding/position-identifying tooth inwardly of the tension member, while the terms "amount of the backing rubber" mean an amount of rubber present in the portion right behind the positioning-aiding/position-identifying tooth outwardly of the tension member.

It should be apparent that the driven teeth of the positioning-aiding/position-identifying toothed belt according to the present invention are identical in tooth shape in order to transmit power from a given drive source. Specifically, in cases where the toothed belt of the invention is applied as a carriage belt in office automation equipment such as a printer or in a precision machine tool, the driven teeth may all be in a straight bevel tooth shape; however, in some special applications, the driven teeth of the inventive toothed belt may all be in a skew bevel tooth shape. Further, the driven teeth of the inventive toothed belt may be formed along either the whole or part of the length of the belt body depending on the intended application of the toothed belt.

Moreover, the positioning-aiding/position-identifying tooth of the toothed belt of the present invention may be formed into any desired shape, e.g., into a trapezoidal, substantially semicircular or parabolic sectional shape, as long as the positioning-aiding/position-identifying tooth can perform its positioning-aiding/position-identifying functions. Further, although it is desirable that the positioning-aiding/position-identifying tooth of the toothed belt has a length equal to or greater than a sum of the lengths of two driven teeth and intervening groove, the length of the positioning-aiding/position-identifying tooth may be set to equal the length of just one such driven tooth.

The above and other objects, features and advantages of the present invention will becomes apparent to these versed in the art upon making reference to the following detailed description and accompanying sheets of drawings in which certain preferred structural embodiments incorporating the principle of the present invention are shown by way of illustrative examples.

DETAILED DESCRIPTION OF THE PREFERRED EMBODIMENTS

Figure 1A:
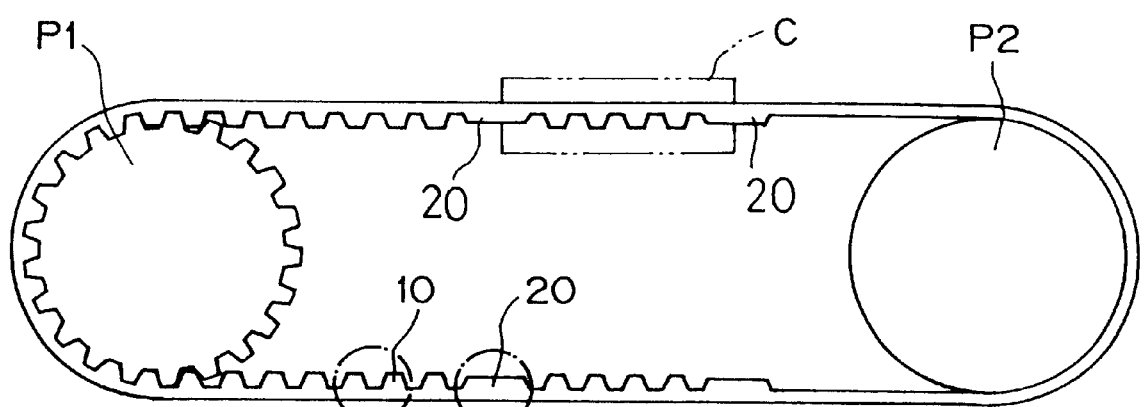
FIG. 1A is a general external view of a positioning-aiding/position-identifying toothed belt in accordance with a preferred embodiment of the present invention.

Certain preferred embodiments of the present invention will be described in greater detail with reference to the 15 accompanying sheets of drawings in which like or corresponding parts are designated by the same reference characters throughout the several views.

Figure 1B:
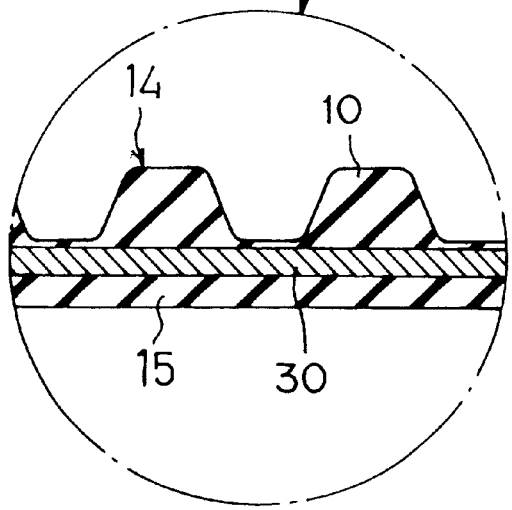
FIGS. 1B and 1C are fragmentary enlarged sectional views explanatory of important features of the toothed belt of FIG. 1A.
Figure 1C:
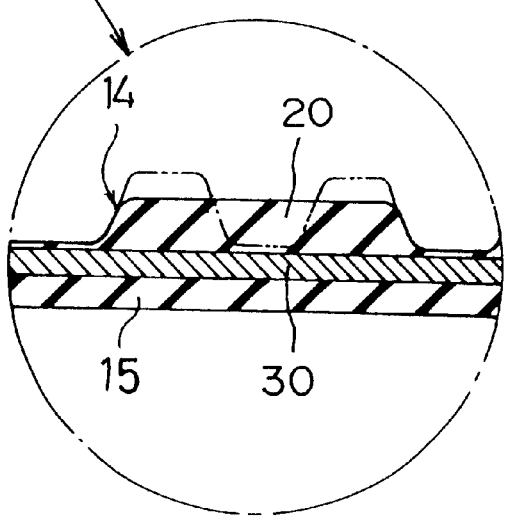

FIG. 1A is a general external view of a positioning-aiding and position-identifying toothed belt 100 in accordance with a preferred embodiment of the present invention, and FIGS. 1B and 1C are fragmentary enlarged views of sections of the toothed belt 100 circled by dot-and-dash line in FIG. 1A. The toothed belt 100 in accordance with the preferred embodiment is an endless power transmission toothed belt which is particularly suitable for use as a carriage belt of a printer. The toothed belt 100 has a toothed belt portion with a series of driven teeth 10 formed in the inner surface of the belt along part of its length, which is wound around a pulley with driving teeth (i.e., driving toothed pulley) P1. The remaining portion of the toothed belt 100 is a flat belt portion with a flat inner surface, which is would around a non-toothed follower pulley P2. In the illustrated example of FIG. 1A, a printer carriage C is mounted on one or more (two in the illustrated example) positioning-aiding/position-identifying teeth 20 formed on a boundary region between the toothed belt portion and the flat belt portion, so that the printer carriage C is reciprocally moved back and forth over a predetermined distance as the toothed belt is driven via the driving toothed pulley P1. In the illustrated example, two pairs of such positioning-aiding/position-identifying teeth 20 are provided on the belt 100 in parallel opposed surfaces of the toothed belt portion, and the printer carriage C is shown as mounted on one of the pairs of the positioning-aiding/position-identifying teeth 20. Each of the positioning-aiding/position-identifying teeth 20 is formed in a predetermined positioning area of the belt 100 at or close to an end of the toothed belt portion. Further, each of the positioning-aiding/position-identifying teeth 20 is shaped differently from the driven teeth 10.

The toothed belt 100 in accordance with the preferred embodiment comprises a laminated structure of tooth rubber and backing rubber members 14 and 15 and a core wire or tension member 30 embedded between the tooth rubber and backing rubber members 14 and 15. The tooth rubber and backing rubber members 14 and 15 are each made of synthetic rubber such as chloroprene rubber, and the tension member 30 is in the form of a cord that is formed of glass fiber, aramid fiber or the like. Further, a tooth cloth sheet made of nylon (not shown) is embedded in the tooth rubber member 14 along the contour of the teeth.

Figure 2A:
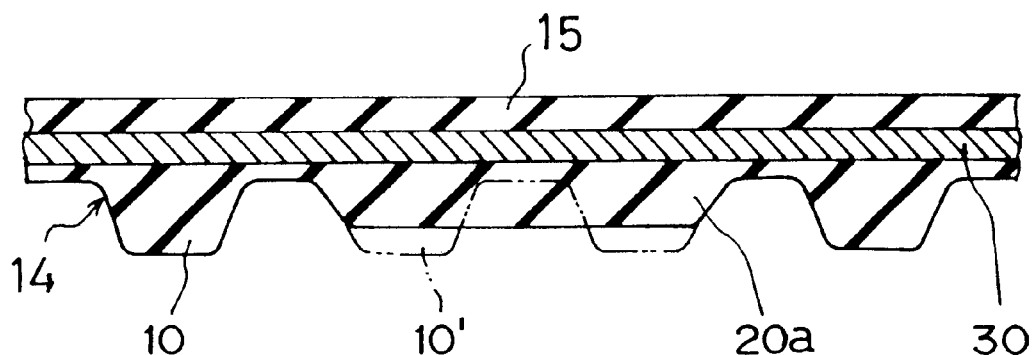
FIGS. 2A to 2C are longitudinal sectional views illustrating three examples of positioning-aiding/position-identifying teeth shown in FIG. 1.
Figure 2B:
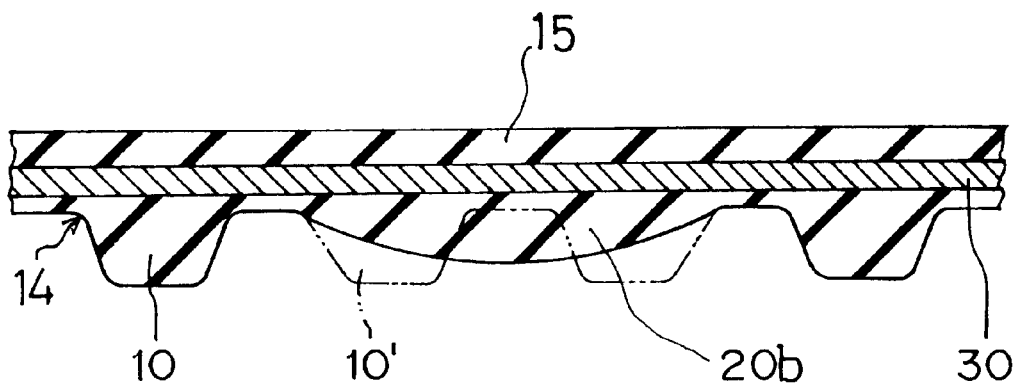
Figure 2C:
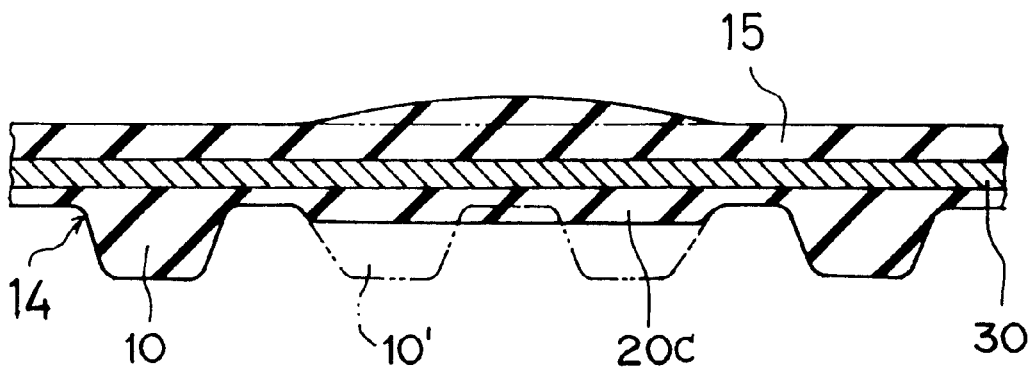

FIGS. 2A to 2C are longitudinal sectional views illustrating three preferred examples 20a, 20b and 20c of the positioning-aiding/position-identifying teeth 20, each of which is formed on the tooth rubber member 14 of the belt 100 and has a total length (i.e., a length along the longitudinal direction of the toothed belt 100) substantially equal to a sum of the lengths of two driven teeth 10 and one groove between the two driven teeth 10'. In other words, two driven teeth 10 and one groove could be formed in each of the predetermined positioning areas if the positioning-aiding/position-identifying teeth 20a, 20b or 20c was not formed therein, and these driven teeth and one groove will be called "imaginary driven teeth" 10' and "imaginary groove". These "imaginary driven teeth" 10' and "imaginary groove" are depicted by broken lines line in each of the figures. More specifically, FIG. 2A shows an example 20a of the positioning-aiding/position-identifying tooth 20 formed into a trapezoidal sectional shape. The backing rubber member is uniform in thickness throughout the length of the toothed belt. FIG. 2B shows another example 20b of the positioning-aiding/position-identifying tooth 20 formed into a substantial semicircular or parabolic sectional shape. The backing rubber member 15 is uniform in thickness throughout the length of the toothed belt. FIG. 2C shows still another example 20c of the positioning-aiding/position-identifying tooth 20 formed into a trapezoidal sectional shape having a very low profile or small height as compared to that of the example 20a of FIG. 2A, and the region of the backing rubber member 15 right behind this low-profile positioning-aiding/position-identifying tooth 20c is raised outwardly (i.e., away from the positioning-aiding/position-identifying tooth 20c in question) to have an increased thickness.

In each of the illustrated examples of FIGS. 2A, 2B and 2C, the total amount of rubber X used in the positioning aiding/position-identifying tooth 20a, 20b or 20c is set to equal an "assumptive" total amount of rubber Y in the imaginary driven teeth 10' that could be formed in the predetermined positioning area (i.e., X=Y), and the amount of backing rubber x used in the portion of the backing rubber member 15 right behind the positioning-aiding/position-identifying tooth 20a, 20b or 20c is set to be equal to or greater than an "assumptive" amount of backing rubber y in the portion of the backing rubber member 15 right behind the two imaginary driven teeth 10' (i.e., $x \geq y$). In this case, the terms "total amount of rubber" mean a sum of the amounts of the tooth rubber and backing rubber required to form the positioning-aiding/position-identifying tooth 20a, 20b or 20c or the two imaginary driven teeth 10'. The terms "amount of backing rubber" mean an amount of rubber present in the portion of the backing rubber member 15 right behind the positioning-aiding/position-identifying tooth 20a, 20b or 20c or the two imaginary driven teeth 10' outwardly of the tension member 30. Note that the positioning-aiding/position-identifying tooth 20a, 20b or 20c may have a total length greater than the sum of the lengths of two imaginary driven teeth 10' and one imaginary groove.

According to the illustrated examples of FIGS. 2A to 2C, the positioning-aiding/position-identifying tooth 20a –20c can be formed to have a predetermined tooth contour and tooth projection by only making a slight modification to the belt-forming die, and thus there would not be caused a shortage of the rubber material required for forming the positioning-aiding/position-identifying tooth 20a –20c. Therefore, it is possible to reliably prevent formation of an undesired recess in the outer surface of the toothed belt and exposure of the tension member 30 due to scaling-off of the backing rubber member 15 which were the problems with the prior art toothed belts. As a result, the present invention achieves enhanced durability of the manufactured toothed belt. Further, the present invention allows a desired attachment or part to be reliably mounted on a predetermined position of the belt body and also permits accurate recognition of information from that predetermined position.

Figure 3A:
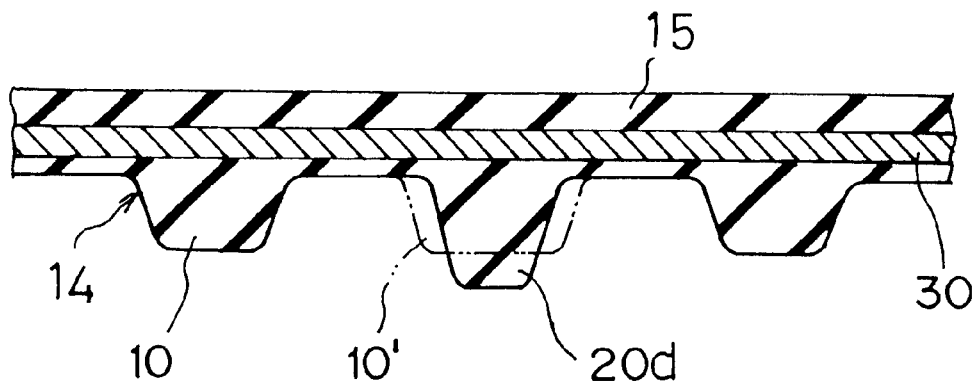
FIGS. 3A to 3C are longitudinal sectional views illustrating three other examples of the positioning-aiding/position-identifying teeth shown in FIG. 1.
Figure 3B:
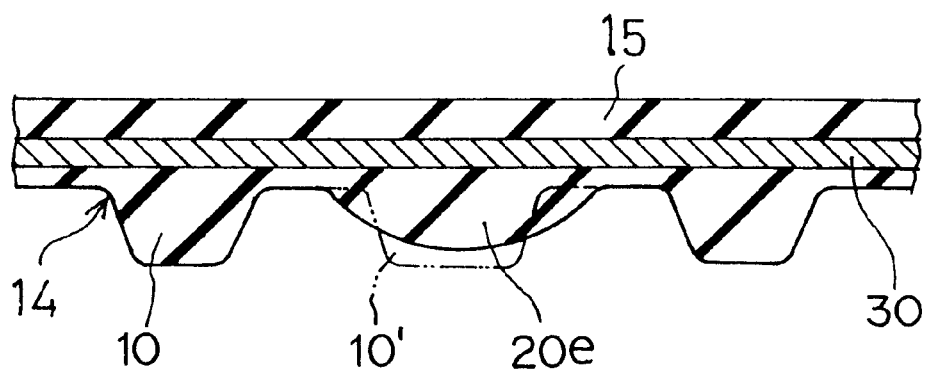
Figure 3C:
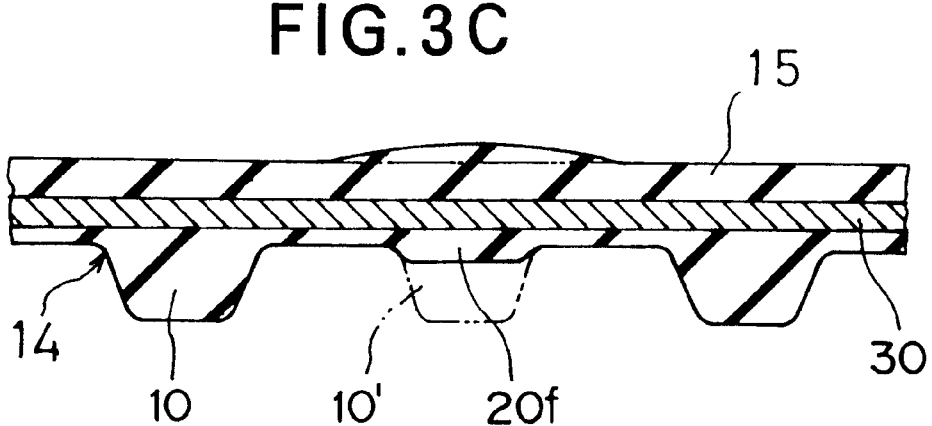
Figure 4:
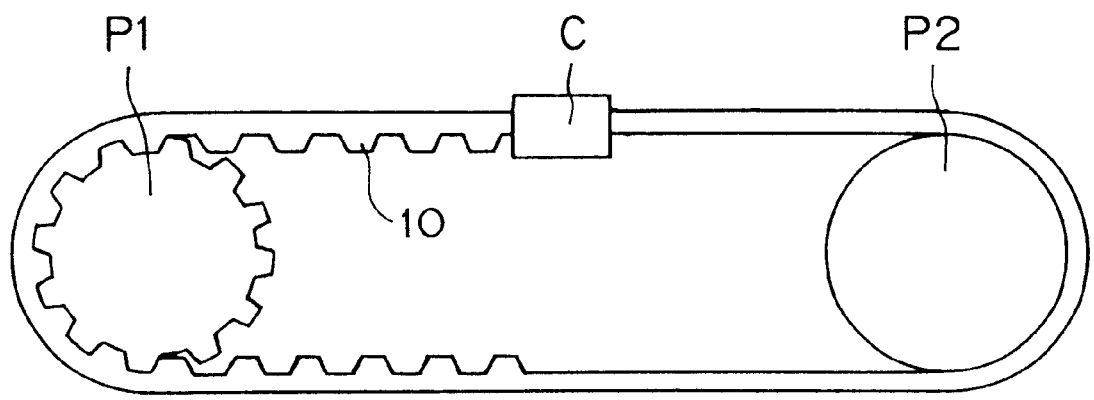
FIG. 4 is a general external view of a conventional toothed belt.
Figure 5:
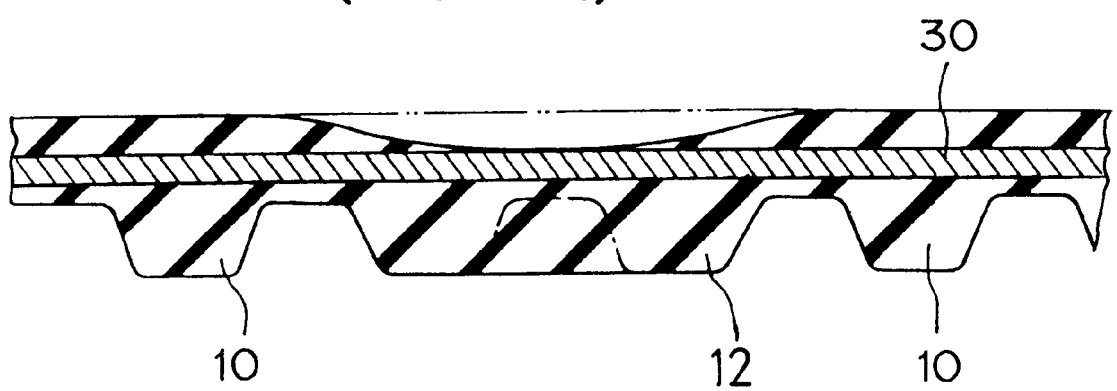
FIG. 5 is a fragmentary sectional view of the conventional toothed belt.

FIGS. 3A to 3C are longitudinal sectional views, similar to FIGS. 2A to 2C, illustrating three other examples 20d –20e of the positioning-aiding/position-identifying teeth 20, each of which is formed on the tooth rubber member 14 of the belt 100 and has a total length substantially equal to the length of a single driven tooth 10 (in this case, one "imaginary driven tooth" 10'). The "imaginary driven tooth" 10', which could be formed in the predetermined positioning area, is depicted by broken lines in each of the figures. More specifically, FIG. 3A shows an example 20d of the positioning-aiding/position-identifying tooth 20 formed into a trapezoidal sectional shape having a narrowed distal end surface projecting beyond those of the driven teeth 10. Accordingly, the positioning-aiding/position-identifying tooth 20 is greater in height than the driven teeth 10. The backing rubber member 15 has a uniform thickness throughout the length of the toothed belt. FIG. 3B shows another example 20e of the positioning-aiding/position-identifying tooth 20 formed into a substantially semicircular or parabolic sectional shape. The positioning-aiding/position-identifying tooth 20 has a smaller height than the driven teeth 10. The thickness of the backing rubber member 15 is uniform throughout the length of the toothed belt. FIG. 3C shows still another example 20f of the positioning-aiding/position-identifying tooth 20 formed into a trapezoidal sectional shape having a very low profile or small height, and the region of the backing rubber member 15 right behind this low-profile positioning-aiding/position-identifying tooth 20f is raised outwardly (away from the positioning-aiding/ position-identifying tooth 20f) to have an increased thickness. The tooth cloth (not shown) is embedded in the booth rubber member 14 along the contour of the distal ends of he teeth.

In each of the illustrated examples of FIGS. 3A, 3B and 3C, the total amount of rubber X used in the positioning-aiding/position-identifying tooth 20d, 20e or 20f is set to equal an assumptive total amount of rubber Y in the imaginary driven tooth 101 that could be formed in the predetermined positioning area of the positioning-aiding/position-identifying tooth 20d, 20e or 20f (i.e., X=Y), and the amount of backing rubber x used in the portion of the backing rubber member 15 right behind the positioning-aiding/position-identifying tooth 20d, 20e or 20f is set to be equal to or greater than the amount of backing rubber y in the portion of the backing rubber member 15 right behind the imaginary driven tooth 10' (i.e., $x \geq y$). In this case, the terms "total amount of rubber" mean a sum of the amounts of the tooth rubber and backing rubber required to form the positioning-aiding/position-identifying tooth 20d, 20e or 20f or the imaginary driven tooth 10'. The terms "amount of backing rubber" mean an amount of rubber present in the portion of the backing rubber member 15 right behind the positioning-aiding/position-identifying tooth 20d, 20e or 20f or the imaginary driven teeth 10' outwardly of the tension member 30.

It will be appreciated that the examples 20d–20f of the positioning-aiding/position-identifying tooth 20 as illustrated in FIGS. 3A, 3B and 3C achieve advantages similar to those achieved by the examples 20a–20c of FIGS. 2A, 2B and 2C.

In summary, the present invention affords unique benefits as set forth below.

(1) With the arrangement that the total amount of rubber X used in the positioning-aiding/position-identifying tooth 20a, 20B, 20C, 20d, 20e or 20f is set to equal an assumptive total amount of rubber Y in the imaginary driven tooth or teeth 10' that could be formed in the predetermined positioning area in place of the positioning-aiding/position-identifying tooth 20, 20b, 20c, 20d, 20e or 20f (i.e., X =Y), and the amount of backing rubber x used in the portion of the backing rubber member 15 right behind the positioning-aiding/position-identifying tooth 20 is set to be equal to or greater than an assumptive amount of backing rubber y in the portion of the backing rubber member 15 right behind the imaginary driven tooth or teeth 10' (i.e., $x \geq y$), the positioning-aiding/position-identifying tooth 20a, 20b, 20c, 20d, 20e or 20f can be formed to have a predetermined tooth contour and tooth projection by only making a slight modification to the belt-forming die, without a need to feed an additional amount of the tooth rubber in the form of an unvulcanized rubber compound sheet. This arrangement can reliably avoid a shortage of the rubber material in the area where the positioning-aiding/position-identifying tooth 20a, 20b, 20c, 20d, 20e or 20f is to be formed. Therefore, it is possible to reliably prevent formation of an undesired recess in the outer surface of the toothed belt and exposure of the tension member 30 due to scaling-off of the backing rubber member 15 which were the problems with the prior art toothed belts. As a result, the present invention achieves enhanced durability of the manufactured toothed belt. Further, the present invention allows a desired attachment or part to be reliably mounted on a predetermined position of the belt body and also permits accurate recognition of information from that predetermined position.

(2) By forming the positioning-aiding/position identifying tooth 20a, 20b or 20c to have a length substantially equal to or greater than the sum of the lengths of two imaginary driven teeth 101 and one intervening groove as set forth above, the positioning-aiding/position-identifying tooth 20a, 20b or 20c can be clearly distinguished from the driven teeth 10, which allows the human operator to easily identify the position where a desired attachment or part is to be mounted. In addition, because the positioning-aiding/ position-identifying tooth 20a, 20b or 20c of such a length provides an increased mounting space for the desired part, the part can be mounted on the belt with even further increased reliability, and a sufficient strength required of the positioning-aiding/position-identifying tooth is also achieved.

(3) Because the positioning-aiding/position-identifying tooth is formed in the neighborhood of an end of the toothed belt portion having a large number of the driven teeth and extending along part of the belt length, the toothed belt of the invention can be suitably used as a printing head carriage belt for various printing devices, such as a printer and facsimile, which can be reciprocally moved over a predetermined distance by being wound at the toothed belt portion around a driving toothed pulley and at the flat belt portion around a non-toothed follower pulley, as has been described above.

Obviously, various minor changes and modifications of the present invention are possible in the light of the above teaching. It is therefor to be understood that within the scope of the appended claims the present invention may be practiced otherwise than as specifically described.

What is claimed is:

1. A toothed belt for use with a toothed driving pulley having a series of spaced-apart driving teeth, said belt including a rubber backing and a series of uniformly-spaced rubber teeth comprising:

a sequence of driven teeth engageable with said driving teeth, each of said driven teeth having a shape complementary to the shape of the space between the driving teeth of the pulley, each driven tooth and the backing underlying said driven tooth together having a given amount of rubber, and at least one positioning-aiding/position-identifying tooth formed in a predetermined positioning area of said toothed belt replacing a selected number of driven teeth in said series of rubber teeth, said positioning-aiding/ position-identifying tooth having a different shape from a shape of each of said driven teeth;

wherein the thickness of the backing rubber underlying the position-aiding/positioning-identifying tooth is at least equal to the thickness of the backing rubber underlying the remaining driven teeth.

2. A toothed belt as recited in claim 1, wherein said positioning-aiding/position-identifying tooth replaces two of said driven teeth and one space between the two replaced driven teeth.

3. A toothed belt as recited in claim 1, wherein said belt has a tooth-free length beyond said series of spaced-apart rubber teeth, and said positioning-aiding/position-identifying tooth is adjacent said tooth-free length.

4. A toothed belt as recited in claim 1, wherein said positioning-aiding/position-identifying tooth replaces a single driven tooth.

5. A toothed belt as recited in claim 1 wherein said positioning-aiding/position-identifying tooth has an amount of rubber equal to said given amount of rubber contained in said replaced teeth of a selected number.

6. A toothed belt as recited in claim 2, wherein said belt has a toothed portion with series of spaced-apart rubber teeth extending along part of a length of said toothed belt, and said positioning-aiding/position-identifying tooth is adjacent an end of said toothed belt portion.

7. A toothed belt as recited in claim 2, wherein said positioning-aiding/position-identifying tooth has a smaller height than said driven teeth, and said rubber backing is uniform in thickness throughout the length of said toothed belt.

8. A toothed belt as recited in claim 2, wherein said positioning-aiding/position-identifying tooth has a smaller height than said driven teeth, and said rubber backing underlying said positioning-aiding/position-identifying tooth is raised outwardly to have an increased thickness.

9. A toothed belt as recited in claim 4, said belt has a toothed belt portion with said series of rubber teeth extending along part of its length, and a non-toothed portion extending between the ends of the toothed belt portion, wherein said positioning-aiding/position-identifying tooth is adjacent one end of said toothed belt portion.

10. A toothed belt as recited in claim 4, wherein said positioning-aiding/position-identifying tooth has a greater height than said driven teeth, and said rubber backing is uniform in thickness throughout the length of said toothed belt.

11. A toothed belt as recited in claim 4, wherein said positioning-aiding/position-identifying tooth has a smaller height than said driven teeth, and said rubber backing is uniform in thickness throughout the length of said toothed belt.

12. A toothed belt as recited in claim 4, wherein said positioning-aiding/position-identifying tooth has a smaller height than said driven teeth, and a region of said rubber backing underlying said positioning-aiding/position-identifying tooth is raised outwardly to have an increased thickness.

13. A toothed belt as recited in claim 5, wherein said selected number is one.

14. A toothed belt as recited in claim 5, wherein said selected number is two.

15. A toothed belt as recited in claim 7, wherein said positioning-aiding/position identifying tooth has a trapezoidal sectional shape.

16. A toothed belt as recited in claim 7, wherein said positioning-aiding/position identifying tooth has a substantially semicircular sectional shape.

17. A toothed belt as recited in claim 8, wherein said positioning-aiding/position-identifying tooth has a trapezoidal sectional shape.

18. A toothed belt as recited in claim 11, wherein said positioning-aiding/position-identifying tooth has a substantially semicircular sectional shape.

19. A toothed belt as recited in claim 10, wherein said positioning-aiding/position-identifying tooth has a trapezoidal sectional shape.

20. A toothed belt as recited in claim 12, wherein said positioning-aiding/position-identifying tooth has a trapezoidal sectional shape.

* * * * *

UNITED STATES PATENT AND TRADEMARK OFFICE
CERTIFICATE OF CORRECTION

PATENT NO. : 6,264,579 B1
DATED : July 24, 2001
INVENTOR(S) : Odai et al.

Page 1 of 1

It is certified that error appears in the above-identified patent and that said Letters Patent is hereby corrected as shown below:

<u>Column 4,</u>
Line 57, after "to the" delete "15";

<u>Column 5,</u>
Line 53, after "rubber member" insert -- 15 --;

<u>Column 7,</u>
Line 13, change "101" to -- 10' --;

<u>Column 8,</u>
Line 6, change "101" to -- 10' --.

Signed and Sealed this

Twenty-first Day of May, 2002

Attest:

JAMES E. ROGAN
*Attesting Officer*  *Director of the United States Patent and Trademark Office*